US005462625A

United States Patent [19]

Purcocks

[11] Patent Number: 5,462,625

[45] Date of Patent: Oct. 31, 1995

[54] MAKING REINFORCED TABBED OR INDEXED SHEETS

[76] Inventor: Dale M. Purcocks, 9 Claremont Villas, Glenageary County Dublin, Eire, Ireland

[21] Appl. No.: 185,801

[22] PCT Filed: Aug. 12, 1992

[86] PCT No.: PCT/GB92/01495

§ 371 Date: Jan. 19, 1994

§ 102(e) Date: Jan. 19, 1994

[87] PCT Pub. No.: WO93/03934

PCT Pub. Date: Mar. 4, 1993

[30] Foreign Application Priority Data

Aug. 12, 1991 [IE] Ireland .................................... 2840/91

[51] Int. Cl.[6] ...................................................... B32B 31/18

[52] U.S. Cl. .......................... 156/264; 156/252; 156/265; 156/293; 156/479; 156/513; 156/519; 156/520

[58] Field of Search .................................... 156/252, 264, 156/265, 293, 463, 468, 479, 483, 513, 514, 519, 520, 201, 202, 290

[56] References Cited

U.S. PATENT DOCUMENTS

| | | | |
|---|---|---|---|
| 3,000,430 | 9/1961 | Ganz et al. | 156/264 |
| 3,232,808 | 2/1966 | Dries et al. | 156/519 X |
| 3,245,859 | 4/1966 | Busk | 156/479 |
| 3,505,145 | 4/1970 | Martensson | 156/265 |
| 3,671,347 | 6/1972 | Yoshieda . | |
| 3,926,713 | 8/1973 | Lowe et al. | 156/566 |
| 4,032,385 | 6/1977 | Petry et al. | 156/252 |
| 4,354,890 | 10/1982 | Maffey | 156/264 |
| 4,453,990 | 6/1984 | Takahashi | 156/479 X |
| 4,458,463 | 5/1986 | Barber et al. | 156/201 X |
| 4,689,100 | 8/1987 | Coleman | 156/252 X |
| 4,911,777 | 4/1990 | Truc et al. | 156/290 X |

FOREIGN PATENT DOCUMENTS

| | | | |
|---|---|---|---|
| 59-84725 | 5/1984 | Japan | 156/252 |
| 8201511 | 5/1982 | WIPO | 156/252 |

*Primary Examiner*—David A. Simmons
*Assistant Examiner*—Steven J. Helmer
*Attorney, Agent, or Firm*—David P. Gordon

[57] ABSTRACT

Tabbed or indexed sheets typically for use in ring binders or other stationery applications are produced from a web of sheet material by means of forming an aperture in the sheet material and inserting through the aperture a length of reinforcing material. The length of reinforcing material is secured to the opposed faces of the sheet material and the individual sheet separated from the remainder of the web of sheet material by cutting to form a trailing edge and a leading edge for the sheet. In cutting the sheet material to form the leading edge of the sheet, a tab or indexed portion of the reinforcing material is obtained at the leading edge.

19 Claims, 3 Drawing Sheets

MAKING REINFORCED TABBED OR INDEXED SHEETS

BACKGROUND OF THE INVENTION

The present invention relates to a method and apparatus for producing tabbed or indexed sheets.

SUMMARY OF THE INVENTION

Tabbed or indexed sheets are used as dividers, for example, in ring binders or in other stationery applications. In the simplest form, the material forming a sheet is cut to define a tab projecting from its leading edge. However, where a number of such sheets are to be used, they each need to have their tab at a different position along the leading edge, and this complicates the manufacture. In addition, where the tab is formed of the sheet material, the tab may not be sufficiently strong to withstand wear and tear. Increasingly, reinforced tabs, for example of polyester sheets are provided. For example, each tab may be formed by a strip of the reinforcing material secured to the leading edge of the sheet. This has the advantage that the tabs are relatively strong, and additionally different colour tabs can be provided to aid the user distinguish between the sheets. The reinforcing material forming the tab may be arranged to leave a space between two facing parts whereby an insertable tab is defined. Furthermore, irrespective of the manner of their formation, each tab may be printed with a letter, a number, or other indexing marks so that a set of the tabbed sheets provides an index.

Because each tab is at a different position along the leading edge of its sheet, may be of a different colour, and may carry an index letter or number, the production of such tabbed or index sheets currently requires the use of large, complex and expensive machinery. Frequently, for speed, a quantity of sheets having one particular configuration are fabricated, and then a quantity of sheets having a different configuration are made, and so on. A collator is then used to form sets each including one sheet of each configuration. For example, in its first configuration, a sheet may have a tab at one end of its leading edge, the tab being printed with the letter "A". A second configuration of sheet may have a tab spaced from the one end of its leading edge by about the width of a tab and printed with the letter "B", and so on.

The present invention seeks to provide a method and apparatus for producing tabbed or indexed sheets which is simpler and more convenient than the known methods.

According to the present invention there is provided a method of producing a tabbed sheet from sheet material, the method comprising the steps of forming at least one aperture in the sheet material, inserting a length of reinforcing material through said aperture and securing the reinforcing material to the opposed faces of the sheet material, and cutting the sheet material to define a leading edge for the sheet from which said reinforcing material protrudes and defines a tab.

In a preferred embodiment, the reinforcing material within said aperture is folded to define a leading edge for said tab which remains uncut for strength.

In a preferred embodiment, said aperture is an elongate slot arranged proximate to and extending substantially parallel to the leading edge of the sheet to be formed. Preferably, the reinforcing material is inserted into the slot and is then folded and crimped to engage one edge of the elongate slot and to be substantially flat along the opposed faces of the sheet material. The reinforcing material may be secured to the opposed faces by any suitable means. In a preferred embodiment, the securing means may be heat sealing, thermoplastics, or thermosetting means. For example, the reinforcing material may be thermoplastics and arranged to adhere to the sheet upon heating.

In an alternative embodiment, each said aperture comprises a substantially elongate slot arranged proximate to and substantially parallel to the leading edge of the sheet to be formed, the aperture further having a cut out portion extending from one edge of the slot. As previously, a length of a reinforcing material is inserted into the aperture and secured to opposed faces of the sheet. The tab is defined such that the reinforcing material extending over the cut out portion defines a sleeve of an insertable tab.

In an embodiment, the method of producing a tabbed sheet is utilized to produce a series of tabbed sheets from a web of sheet material, the method further comprising the steps of feeding the sheet material from the web, and forming a series of spaced apertures along the sheet material such that there is at least one aperture in each sheet to be formed from said web.

Preferably, the method further comprises finally separating a leading sheet from the web, wherein the leading sheet is separated from the web in a cutting operation which both forms a trailing edge for said leading sheet and defines the tabbed leading edge on a following sheet. Advantageously, the apparatus for performing the method includes a separating blade specifically adapted to perform this function.

In an embodiment, the sheet material is fed from the web through a number of operating stations, a respective operation being performed on the sheet material at each said station. In this respect, the sheet material is preferably fed intermittently from the web.

In an embodiment, the material is fed from the web periodically in sheet lengths and is controlled such that when the web is stationary, a respective sheet length is arranged in each said operating station.

In a preferred embodiment, a number of substantially aligned holes are punched adjacent the trailing edge of the sheet length arranged in one of said operating stations. Preferably, at an operating station preceding said one station a reinforcing strip is applied to the trailing edge of the sheet length arranged therein adjacent to said trailing edge.

Preferably, the method further comprises printing a substantially aligned series of index marks adjacent the leading edge of the respective sheet length at a further one of said operating stations. The aligned index marks may comprise a series of consecutive letters from the alphabet, or a series of consecutive numbers. In the subsequent cutting operating at which a tabbed leading edge is defined, all but one of said index marks is arranged to be cut away.

In a preferred embodiment, punch means are provided at one said operating station for providing a number of substantially aligned holes adjacent the trailing edge of the sheet length arranged in said one operating station. Preferably, at an operating station preceding said one station, means are provided for applying a reinforcing strip to the sheet length arranged therein, for example, adjacent to the trailing edge thereof.

The invention additionally extends to apparatus for producing a tabbed sheet from sheet material, the apparatus comprising means for forming at least one aperture in the sheet material, means for inserting a length of reinforcing material through said aperture, and subsequent cutting means for cutting the sheet material to define a leading edge for the sheet from which said reinforcing material protrudes and defines a tab.

Typically, the apparatus further comprises feeding means for feeding the sheet material from the web, and subsequent cutting means for separating a leading sheet from the web, said cutting means being arranged both to form a trailing edge for said leading sheet and to define a tabbed leading edge on a following sheet.

The apparatus may also further comprise applicator means for applying a series of index marks substantially transversely of the sheet material, and preferably cutting means for cutting the sheet material to define a substantially transversely extending leading edge of a sheet and to remove all but a selected one of said applied index marks, said selected one of the marks being in the region of the tab.

The invention will now be further described in specific embodiments by way of example only, and with reference to the accompanying drawings.

DETAILED DESCRIPTION OF THE PREFERRED EMBODIMENTS

Figure 1:
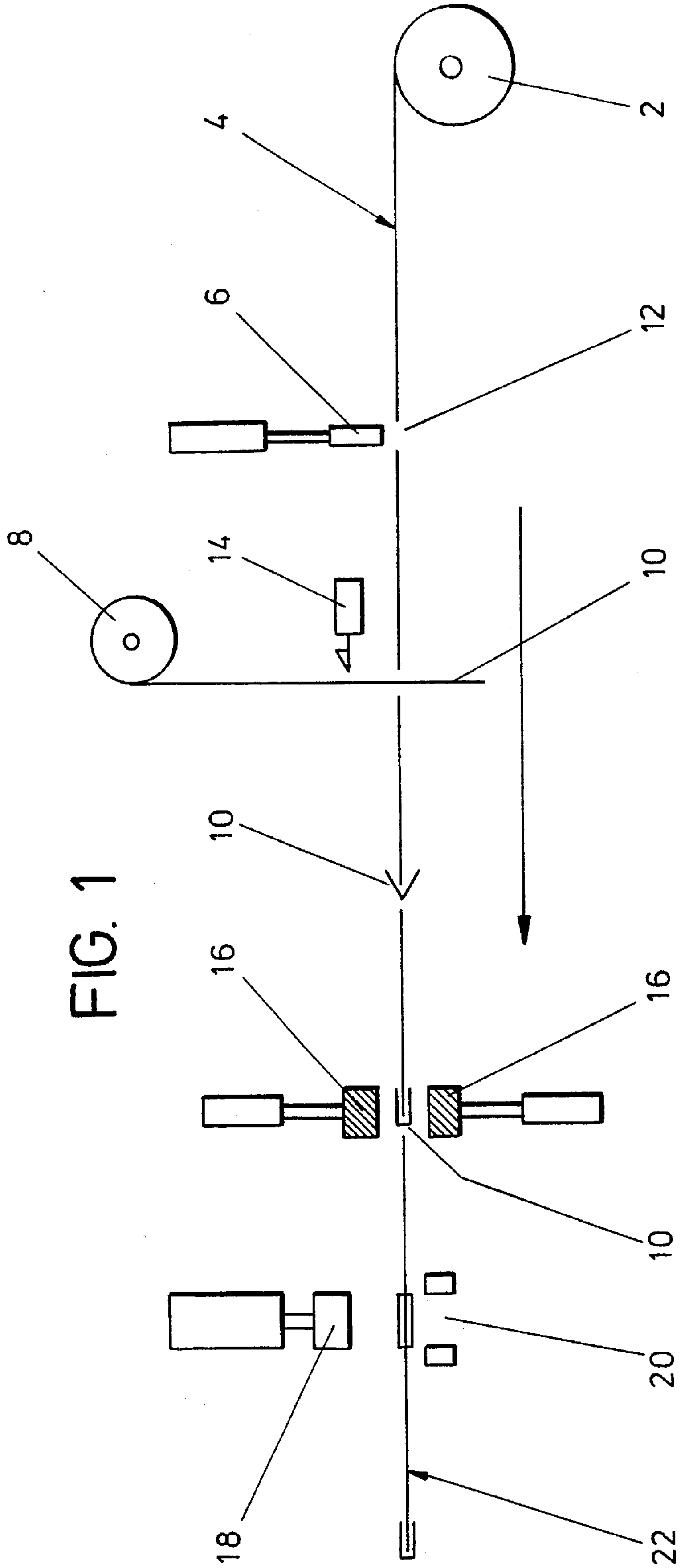
FIG. 1 shows schematically a side elevation of apparatus of the present invention for producing a series of tabbed sheets.

FIG. 1 shows schematically a side elevation of apparatus of the present invention for producing a series of tabbed sheets from a web 4 of a sheet material. The sheet material, which may be of any suitable material such as paper, card or board, is provided on a reel 2 to be fed through the apparatus. In this respect, feed rollers (not shown) can be provided to draw the material from the reel 2. As we shall see, it is preferred for the material to be drawn from the reel 2 periodically so that it comes to rest successively in a number of operating stations. Preferably, means are provided to index the drawing of the web 4 such that it is accurately fed to the operating stations in turn. For example, the feed rollers may be driven by a stepper motor (not shown) used to drive or control the drive of operating means of said operating stations.

In the apparatus shown in FIG. 1, the web 4 is to form a plurality of individual sheets each having their leading and trailing edges extending substantially transversely to the direction of feed of the web 4. The web is fed first through an operating station which includes a punch 6 arranged to cut a slot in the web 4. The punch 6 is controlled relative to the indexing of the web 4 such that an individual slot 12 is punched in each sheet of the web, each individual slot being proximate to and substantially parallel to the leading edge of the respective sheet. As we shall see below, the transverse position of the slot 12 in each sheet can be adjusted as required.

The web 4 is fed next to an operating station at which there is at least one reel 8 of reinforcing material 10. In the preferred embodiment, the reinforcing material is an elongate strip of a plastics or thermoplastics material such as "MYLAR" (registered trade mark). In an embodiment, the reel 8 is arranged to extend over the transverse extent of the web 4 and to carry a number of strips of reinforcing material, each of a different colour. When the web 4 is at rest with one sheet in the operating station, a length of the reinforcing material 10 is inserted through the earlier formed slot 12. The insertion can be achieved simply by unwinding the reinforcing material 10 from the reel 8. A predetermined length of the reinforcing material 10 is unwound, and then a predetermined length, extending through the slot 12, is severed by way of a retractable knife indicated at 14.

Subsequent movement of the web 4 in its direction of feed tends to cause the length of reinforcing material 10 in the slot 12 to be folded over opposite to the direction of movement of the web 4. If required, pinch rollers (not shown) may be provided to flatten the reinforcing material 10 against opposed faces of the respective sheet. Such pinch rollers may be arranged to crimp the fold at the leading edge of the reinforcing material 10 to give a sharp leading edge thereto.

At the next operating station, the web 4 brings the folded reinforcing material 10 to rest between the jaws 16 of a hydraulically operated heating and clamping arrangement. Each jaw 16 is heated and is operable to move towards the other jaw to clamp the folded reinforcing material therebetween. Where the reinforcing material is thermoplastics, the heat of the jaws 16 causes the reinforcing material to adhere to the opposed faces of the respective sheet. The jaws 16 are then retracted.

Further feeding of the web 4 brings the sheet with the reinforcing material adhered to an operating station having a punch 18 with appropriate die 20. The punch 18 and die 20 are arranged to sever the material substantially transversely of the web 4 to define a trailing edge of a first leading sheet 22 and also to define a leading edge of the following sheet.

Figure 2:
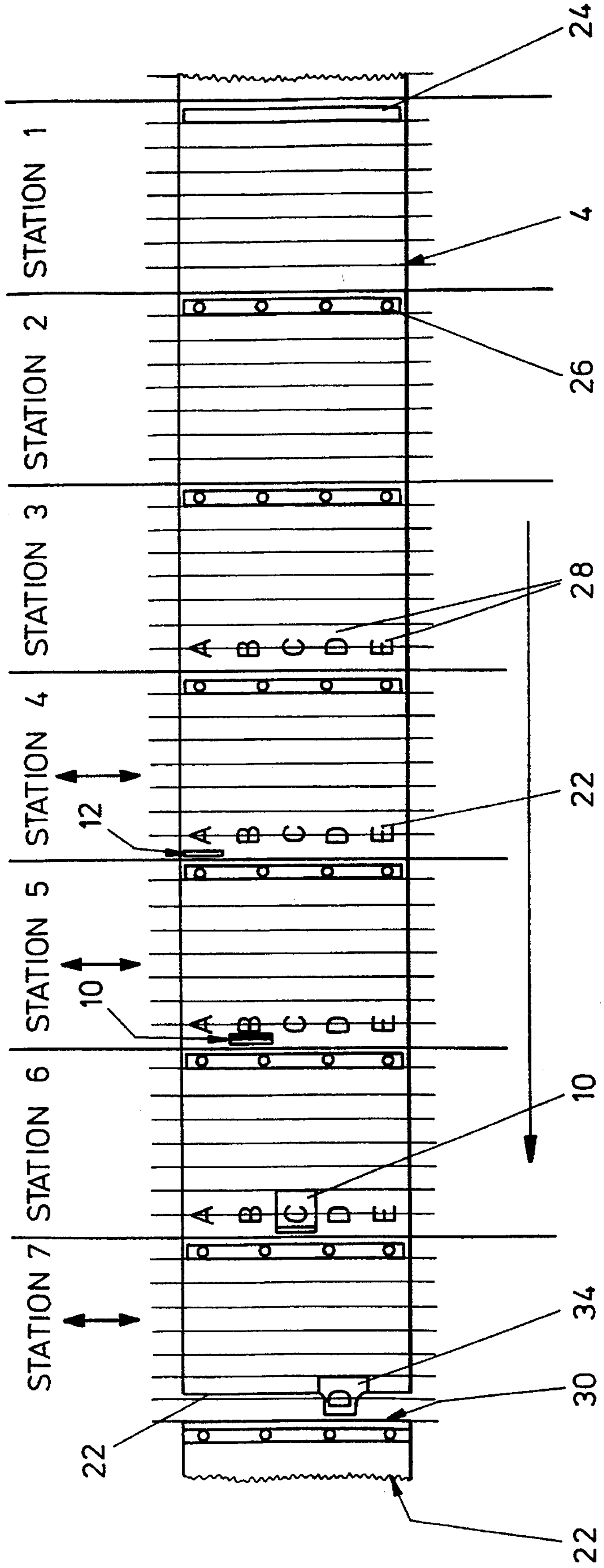
FIG. 2 shows schematically a plan view of a web of sheet material illustrating successive steps of a method of the invention for producing a series of tabbed sheets.
Figure 3:
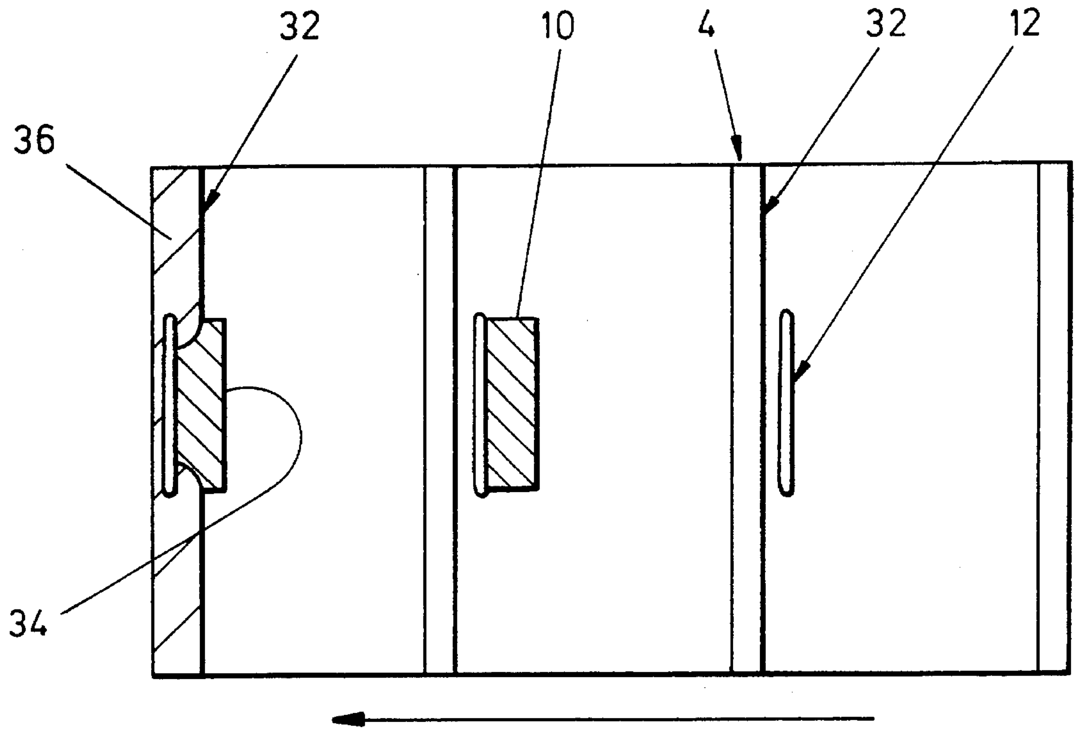
FIG. 3 is a plan view of a web showing successive steps in the formation of a tab by a method of the invention.

The effect of the operations undertaken by the apparatus of FIG. 1 can best be understood with reference to FIGS. 2 and 3. FIG. 2 shows a plan view of the web 4 as it is moved successively through seven operating stations, whereas FIG. 3 shows a length of the web specifically illustrating the production of a tab on a sheet formed therefrom.

In the embodiment shown in FIG. 2, the material undergoes a number of operations which are not provided for by the apparatus of FIG. 1. In this respect, the web 4 of FIG. 2 is fed first to an operating station 1 at which a reinforcing strip 24 of a suitable material is adhered to the web to extend transversely thereof. As can be seen, this reinforcing strip 24 is elongate and is arranged to extend proximate to and substantially parallel to what will become the trailing edge 30 of a respective sheet. The web 4 is then indexed forwardly, as indicated by the arrow, and movement thereof is ceased when the sheet which was originally in station 1 is correctly aligned in operating station 2. In station 2, a punch (not shown) punches holes 26 through the reinforcing strip 24 and through the web 4. In this manner, reinforced holes aligned along the trailing edge of each sheet are provided.

The web is again indexed forwardly so that the sheet from operating station 2 is now correctly positioned in operating station 3. In this station 3, a print head (not illustrated) is applied to the web 4 to print an aligned series of index marks 28 transversely of the sheet. Clearly, any required index marks may be applied by printing, or by other means, at this station 3. The index marks 28 may comprise all of the letters of the alphabet, or simply a selection thereof, or a series of numbers, or the like. Once the required index marks 28 have been applied, the web 4 is moved forwardly so that the printed sheet is correctly aligned in operating station 4. It is operating station 4 which includes the slot punch 6 of FIG. 1, and as can be seen in FIG. 2, the punch 6 is operated to provide the slot 12 adjacent to one of the index marks 28. In the embodiment illustrated in FIG. 2, the slot punch 6 is movable transversely relative to the web 4 and is controlled to be indexed together with the web 4. Thus, after each operation, the slot punch 6 is moved transversely relative to the web 4 so that it is aligned alongside the next index mark 28. As is therefore immediately apparent from FIG. 2, as the web 4 is fed through the operating stations, slots 12 are formed against successive index marks 28.

After a slot 12 has been formed, the web 4 is indexed forwardly to position the slotted sheet in operating station 5 at which the reinforcing material 10 is inserted through the slot 12. As indicated, where there is only a single reel 8 of reinforcing material 10, the reel may be indexed to move transversely of the web 4 so that it offers a length of reinforcing material 10 to each successive slot 12 arriving. Alternatively, a number of reels 8 carrying the reinforcing material may be arranged transversely of the web and operated in their turn so that reinforcing material 10 is presented to the slot provided.

It is at operating station 6 that the reinforcing material 10 is heat clamped to the opposing faces of the sheet by way of the jaws 16 or other heat clamping means. In this respect, each heat clamp may extend over the full transverse extent of the web 4. Alternatively, it would be possible to index the heat clamps 16 transversely of the web if required.

The web then moves forward to position the sheet with secured reinforcing material in operating station 7 which incorporates the punch 18 and die 20 of FIG. 1. The punch and die are indexable transversely of the web 4 to provide the correct cut for the sheet being formed. In this respect, the punch 18 and die 20 co-operate to cut the web 4 substantially transversely to define the trailing edge 30 of a sheet 22, previously formed, which is thereby separated from the web 4. In the same cutting operation, the punch 18 and die 20 also define a leading edge 32 of the sheet positioned in station 7, from which leading edge 32 a tab 34, formed from the reinforcing material 10, protrudes.

FIG. 3 shows three successive stages in the definition of the tab 34. In FIG. 3, there is shown part of the web 4 having a sheet defined therein in which a slot 12 has been punched adjacent to its leading edge 32. In the next position of this sheet, the reinforcing material 10 is shown as having been inserted through the slot 12 and adhered to the opposed faces of the sheet. The final stage shows the formation of the tab 34. In this respect, the punch 18 and die 20 are controlled to remove the material 36 from the web 4. The leading edge of this removed material is substantially linear and it is this leading edge of the cut which defines the trailing edge 30 of the preceding sheet. The trailing edge of the removed material 36 is substantially linear but is gapped, representing a gap in the punch, die combination. Thus a cut is produced which is substantially linear and extends substantially transversely of the web to define the leading edge 32. However, in the region of the slot 12 and reinforcing material 10 the punch and die are shaped to form longitudinally extending, shaped side surfaces of the reinforcing material 10, and to join the cut at the leading edge 32 with the slot 12. Thus, the fold at the leading edge of the reinforcing material 10 is released and forms the leading edge of a tab 34 so formed. It will thus be appreciated from FIG. 3 that the tab 34 has a folded leading edge and therefore a very strong resistance to use. This is quite distinct from many prior art tabs which are formed by cutting and which have a cut leading edge which is subject to fraying and the like.

Figure 4:
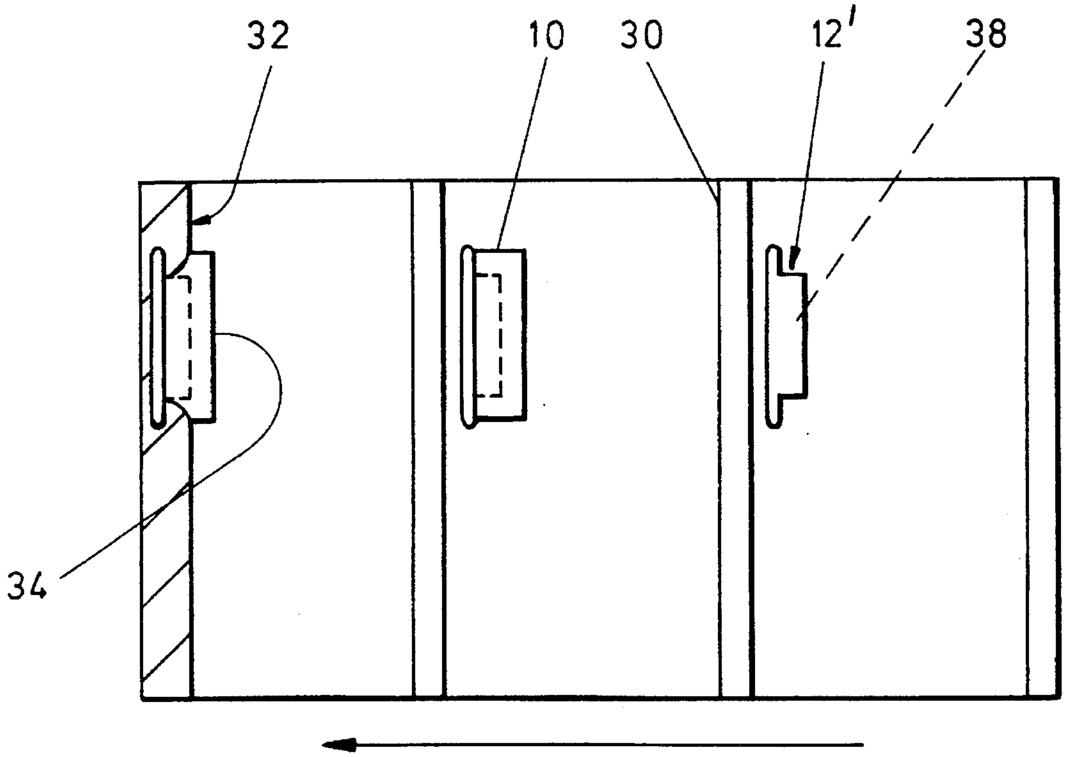
FIG. 4 shows a plan view of a web of sheet material showing successive steps in the formation of an insertable tab by a method of the invention.

FIG. 4 shows a view similar to FIG. 3 showing the formation of an insertable tab. In this respect, the elongate slot 12 is replaced by an aperture 12' which has a leading edge substantially parallel to the leading edge 32 of the sheet to be formed but has a rectangular cut out portion 38 provided on the trailing edge of the slot. As previously, a length of reinforcing material 10 is inserted through the slot and folded over to contact the opposed faces of the sheet. The reinforcing material 10 is secured to the sheet, for example by heat clamping, but in this case it is ensured, for example by suitable shaping of the clamps 16, that the parts of the reinforcing material 10 which face each other across the cut out 38 are not adhered. Thereafter, the leading edge 32 of the sheet is released by the punch and die to define a protruding tab 34 as previously. However, it will be immediately appreciated from FIG. 4 that the non-adhered facing parts of the material 10 define a sleeve in which index cards, for example, may be inserted.

It will be immediately appreciated from FIG. 2 that the method of the invention enables a series of tabbed sheets to be produced directly from a web without the need for any collating to put the resultant sheets into sets. In this respect, successive sheets can be arranged to have their tab in the succeeding position along the transverse extent thereof and for the tab to carry the next appropriate index mark. It is simply necessary to place a collecting tray after station 7 to receive the sets so formed.

In the embodiments described the sheets are produced to have differently positioned tabs and different index marks. However, it will be appreciated that the index marks can be omitted if required.

Other modifications and variations to the method and apparatus as described above may be made within the scope of this application.

I claim:

1. A method of producing a tabbed or indexed sheet from a web of paper, card, or cardboard sheet material, the method comprising the steps of cutting at least one aperture in the sheet material, inserting a length of reinforcing material through the aperture and securing the reinforcing material to the opposed faces of the sheet material, and cutting the sheet material to define a leading edge and a trailing edge for the sheet such that the sheet is separated from the remainder of the web of sheet material, whereby in cutting the sheet material to define the leading edge, a tab or indexed portion of the reinforcing material is obtained at the leading edge.

2. A method according to claim 1, wherein the tab or indexed portion obtained protrudes from the remainder of the leading edge of the sheet.

3. A method according to claim 1, wherein the reinforcing material inserted through the aperture and is folded to define a leading edge of the reinforcing material for the tab or indexed portion.

4. A method according to claim 1, wherein the tab or indexed portion comprises a portion of the sheet material having secured to opposed faces thereof respective portions of the reinforcing material.

5. A method according to claim 1, wherein the means for securing the reinforcing material to the opposed faces of the sheet material comprises heat sealing means.

6. A method according to claim 1, wherein the cutting operation which forms the trailing edge of the sheet also forms the leading edge of a following sheet.

7. A method according to claim 1, wherein said reinforcing material comprises flexible plastics strip or sheet.

8. A method according to claim 1, wherein the sheet material is fed from the web through a plurality of operating stations, a respective operation being performed on the sheet material at each station.

9. A method according to claim 8, wherein the sheet material is fed intermittently from the web such that the sheet material is fed in sheet lengths to respective locations in the operating stations, in which locations the sheet material is transiently maintained stationary.

10. A method according to claim 1, wherein the aperture cut in the sheet material comprises an elongate slot arranged proximate to and extending substantially parallel to the leading edge of the sheet to be formed.

11. A method according to claim 10, wherein the aperture further comprises a cut-out portion extending from one edge of the slot, whereby when the length of reinforcing material is inserted into the aperture and secured to opposed faces of the sheet, the tab defined is such that the reinforcing material forms a sleeve extending over the cut-out portion.

12. A method of producing a series of tabbed or indexed sheets from respectively adjacent portions of a web of sheet material, the method for forming each sequential sheet comprising the steps of forming at least one aperture in each sequential sheet, inserting a length of reinforcing material through the aperture and securing the reinforcing material to the opposed faces of the sheet material, and cutting the sheet material to define a leading edge and a trailing edge for the sheet such that the sheet is separated from the remainder of the web of sheet material, whereby in cutting the sheet material to define the leading edge, a tab or indexed portion of the reinforcing material is obtained at the leading edge, the tab or indexed portion obtained on sequential sheets being spaced in a direction transverse to the longitudinal direction of the web of sheet material.

13. A method according to claim 12, wherein at respective operating stations respective ones of the following operations are performed;

(a) a plurality of substantially aligned holes are punched adjacent the trailing edge of the sheet length; and/or (b) a reinforcing strip is applied to the trailing edge of the sheet length; and/or (c) an indexing mark is printed adjacent the leading edge of the sheet length.

14. Apparatus for producing tabbed or indexed sheets from a web of paper, card, or cardboard sheet material, the apparatus comprising aperture forming means for forming at least one aperture in the sheet material, means for inserting a length of reinforcing material through the aperture, and cutting means for cutting the sheet material to;

(a) define a leading edge for the sheet, the leading edge having a tab or indexed portion of the reinforcing material contiguous therewith; and (b) define a trailing edge for the sheet, whereby the sheet is separated from the remainder of the web of sheet material.

15. Apparatus according to claim 14, wherein the cutting means is adapted to cut the leading edge, such that the tab or indexed portion protrudes from the remainder of the leading edge.

16. Apparatus according to claim 14, wherein the cutting means is arranged to cut simultaneously the trailing edge for the sheet and the leading edge of a following sheet.

17. Apparatus according to claim 14, which comprises a plurality of operating stations through which the sheet material is fed, operating means being arranged at each station to perform a respective operation on the sheet material.

18. Apparatus according to claim 17, wherein feed means is arranged to feed the sheet material intermittently from the web, such that when the web is stationary, a respective sheet length is arranged in each operating station.

19. Apparatus of producing a tabbed or indexed sheet from a web of sheet material, the apparatus comprising aperture forming means for forming successive apertures in the sheet material, said successive apertures being spaced in a direction transverse to the longitudinal direction of the web of sheet material, means for inserting a length of reinforcing material through each aperture and cutting means for cutting the sheet material to;

(a) define a leading edge for the sheet, the leading edge having a tab or indexed portion of the reinforcing material contiguous therewith; and (b) define a trailing edge for the sheet, whereby the sheet is separated from the remainder of the web of sheet material.

* * * * *